United States Patent [19]

Reinecke et al.

[11] Patent Number: 4,661,910

[45] Date of Patent: Apr. 28, 1987

[54] PROTECTION CIRCUIT FOR DETECTING UNDERVOLTAGES IN THE ELECTRICAL CHARGING SYSTEM OF A MOTOR VEHICLE

[75] Inventors: Erich Reinecke, Burgdorf; Gerhard Ruhnau, Neustadt, both of Fed. Rep. of Germany

[73] Assignee: WABCO Westinghouse Fahrzeugbremsen GmbH, Hanover, Fed. Rep. of Germany

[21] Appl. No.: 730,890

[22] Filed: May 6, 1985

[30] Foreign Application Priority Data

Sep. 25, 1984 [DE] Fed. Rep. of Germany ....... 3435055

[51] Int. Cl.$^4$ .............................................. B60T 8/88
[52] U.S. Cl. ..................................... 364/426; 303/92; 318/52; 361/92
[58] Field of Search ................. 364/426; 318/139, 52; 303/91, 92, 24 BB, 95; 320/31; 361/86, 92, 238; 180/197; 340/52 B

[56] References Cited

U.S. PATENT DOCUMENTS

| 3,874,743 | 4/1975 | Fleischer et al. | 303/92 |
| 3,966,267 | 6/1976 | McNinch, Jr. et al. | 303/92 X |
| 4,012,681 | 3/1977 | Finger et al. | 320/14 |
| 4,040,676 | 8/1977 | Rajput | 303/92 |
| 4,210,855 | 7/1980 | Harer et al. | 320/13 |
| 4,316,641 | 2/1982 | Weise et al. | 303/92 |
| 4,494,801 | 1/1985 | Ohmori et al. | 303/92 |

Primary Examiner—William M. Shoop, Jr.
Assistant Examiner—Bentsu Ro
Attorney, Agent, or Firm—J. B. Sotak

[57] ABSTRACT

A protection circuit for monitoring and recognizing an undervoltage condition in the electrical system of a motor vehicle having an anti-skid brake control system in order to minimize and reduce any adverse effects on the braking action of the vehicle wheels. The protection circuit includes at least one comparator circuit to recognize if the voltage falls below a predetermined reference threshold voltage. When the supply voltage falls below the threshold voltage, the comparator circuit deactivates at least one of two diagonal switching circuits to remove automatic brakes on at least two wheels of a vehicle by the anti-skid brake control system.

9 Claims, 2 Drawing Figures

PROTECTION CIRCUIT FOR DETECTING UNDERVOLTAGES IN THE ELECTRICAL CHARGING SYSTEM OF A MOTOR VEHICLE

FIELD OF THE INVENTION

This invention relates to a protection circuit for detecting an undervoltage condition of an electrical charging system of a motor and, more particularly, to an anti-skid brake control system having an undervoltage protection circuit for preventing the lockup of the brakes on a motor vehicle.

BACKGROUND OF THE INVENTION

The lower limit of the vehicle electrical system voltage of a motor vehicle is primarily a function of the charge condition of the battery and the rate of the charging current of the dynamo for a vehicle electrical system with a nominal or standard voltage of 24 volts. It has been found that, after a motor vehicle is started with a significantly run-down battery, and only a small battery charging current rate, the voltage will readily drop to 20 volts or less only after a short period of running time. It will be appreciated that voltage drops through lines and over the contact points will also reduce the available amount of voltage. However, these voltage drops are generally less than 1 volt.

When vehicles have significantly rundown batteries and the current demands of the loads are relatively high, e.g., heaters, fans, headlights or an anti-skid system are turned ON immediately after the motor is started; and if the current requirement is not thereby met by the dynamo, an unpredictable undervoltage can occur. The same thing occurs, however, with a consumer requiring only a small current, if the motor is turned OFF or "killed" immediately after being started, and the battery cannot satisfy the small current requirements because of its rundown condition.

For these reasons, a lower limit supply voltage value of 20 volts is specified for the electronic system of an anti-skid system for a 24-volt vehicle electrical system. On the solenoid valves for control of the braking pressure, which are activated by the electronic system actuators, an 18-volt limit is specified as the lower value; so that, in spite of the voltage drop at the actuators, operation of the system is guaranteed even with a weak vehicle electrical system.

If the above-mentioned lower voltage limit of 20 volts is not achieved in the vehicle electrical system of the motor vehicle, it is not possible to guarantee correct operation of an anti-skid system. A previously known anti-skid brake control system of this type is shown and disclosed in published German patent application DE-A No. 22 53 867 which substantially corresponds to U.S. Pat. No. 3,874,743. A disadvantage of this arrangement, however, is that the anti-skid action will cease to operate. If the disengagement takes place during a controlled braking, all the wheels lock up suddenly since, in such a case, the normal braking action takes over.

Another disadvantage of the previously known systems, is that in high-ohmage vehicle electrical systems, the voltage can again increase beyond the threshold voltage after the anti-skid system is turned OFF. If, thereby, the anti-locking system is immediately turned back ON, cycling phenomenon can occur, i.e., the system is continuously turned ON and OFF. In order to prevent this from occurring, it is necessary that the reactivation should only be permitted when the voltage exceeds the threshold value, i.e., by providing a hysteresis.

OBJECTS AND SUMMARY OF THE INVENTION

Accordingly, it is an object of this invention to provide a protection circuit which does not exhibit the above-mentioned disadvantages, and which still allows a limited operation of the anti-skid brake control system when there is a slight voltage drop in the vehicle electrical system.

Another object of this invention is to provide a new and improved undervoltage protection circuit for preventing lockup of the brakes in a vehicle anti-skid brake control system.

A further object of this invention is to eliminate the disadvantages of the prior art type of undervoltage protection control circuit as above described.

In accordance with the present invention, there is provided a protection circuit for monitoring undervoltage conditions in the vehicle electrical system of a motor vehicle equipped with an anti-skid brake control system which is separated into two pairs of operational wheel brake units comprising, a voltage comparator for recognizing when the operating voltage in the vehicle electrical system drops below a first threshold voltage value, and means controlled by the comparator for deactivating one of the two operational wheel brake units of the anti-skid brake control system when the operating voltage drops below the first threshold voltage value.

BRIEF DESCRIPTION OF THE DRAWINGS

The above objects and other attendant features and advantages of the present invention will become more readily apparent from the following detailed description when considered and reviewed in conjunction with the accompanying drawings, in which.

DETAILED DESCRIPTION OF THE INVENTION

Figure 1:
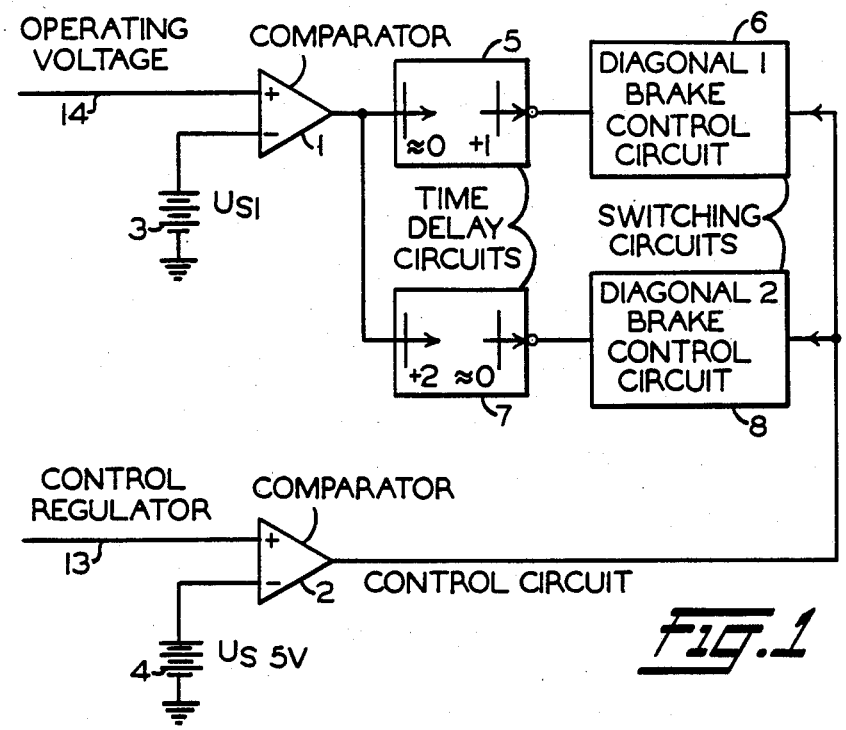
FIG. 1 is a schematic block diagram of an anti-skid brake control system having an undervoltage protection circuit in accordance with the present invention.

Referring now to the drawings, and in particular to FIG. 1, there is shown a schematic block diagram of the protection circuit in accordance with the present invention. As shown, the protection circuit includes a first and a second brake control or diagonal switching circuits 6 and 8 of an anti-skid brake control system. Such an anti-skid control system is divided into two diagonal brake control units for safety purposes, as is shown and described in the published German patent application DE-A No. 29 33 336, which substantially corresponds to U.S. Pat. No. 4,345,796.

The operating voltage of the vehicle electrical supply or charging system, which is developed on supply line 14, is monitored and compared in a first comparing circuit or comparator 1 with a first reference or threshold voltage $U_{S1}$. This reference or threshold voltage is symbolically represented by a storage battery 3; but, in fact, it may be preferably developed by a stable reference voltage by the vehicle electrical system. It will be seen that reference for the other threshold voltages is also represented by the d.c. batteries shown in FIGS. 1 and 2.

As shown, the output of the comparator 1 is connected to the inputs of a pair of parallel-connected time delay circuits or timer elements 5 and 7. In operation, the first timer 5 causes instantaneous deactivation or undelayed disablement of the first diagonal switching circuit 6 when the operating voltage drops below the value of threshold voltage $U_{S1}$. If the operating voltage is above the above-mentioned threshold voltage value, the switch circuit 6 is activated after a certain time delay of $t_1$.

The second time delay element 7 disables the second diagonal switch circuit 8 when the operating voltage drops below the first threshold value $U_{S1}$. However, the disablement is not immediate, but only after a certain time delay of $t_2$. The reconnection of the switching circuit 8 occurs instantaneously, with no delay, when the operating voltage reaches the threshold voltage. The above-mentioned delay times have the following values wherein $t_1 = 50$ ms and $t_2 = 5$ sec.

In addition to the operating voltage of the vehicle electrical system, the internal supply voltage of the antiskid electronic system is also monitored. If the electronic system contains a microcomputer, this supply voltage is approximately 5 volts. This voltage is produced by a voltage regulator or a regulating circuit from the operating voltage of the vehicle electrical system. The internal voltage on line 13 is compared in a second or an additional comparator 2 with a second threshold voltage $U_{S5}$ of 5 volts from a symbolically represented battery 4. If the battery voltage of 5 volts is no longer present, both diagonal switching circuits 6 and 8 are immediately deactivated or disabled.

The protection circuit, illustrated schematically in FIG. 1, with only one threshold voltage $U_{S1}$ for the operating voltage and with delay timers, of course has the disadvantage that after the motor has been started, the first diagonal control circuit 6 is turned OFF by the voltage interruption this causes. Since the vehicle is still not moving, however, this is not a major disadvantage.

It will be appreciated that the first timer element 5 can also be equipped with a time delay. This prevents an unnecessary deactivation of the first diagonal switch circuit 6 when short-term voltage interruptions occur in the operating voltage. Since the delay can be accomplished by the microcomputer, this results in only a negligible added expense.

Figure 2:
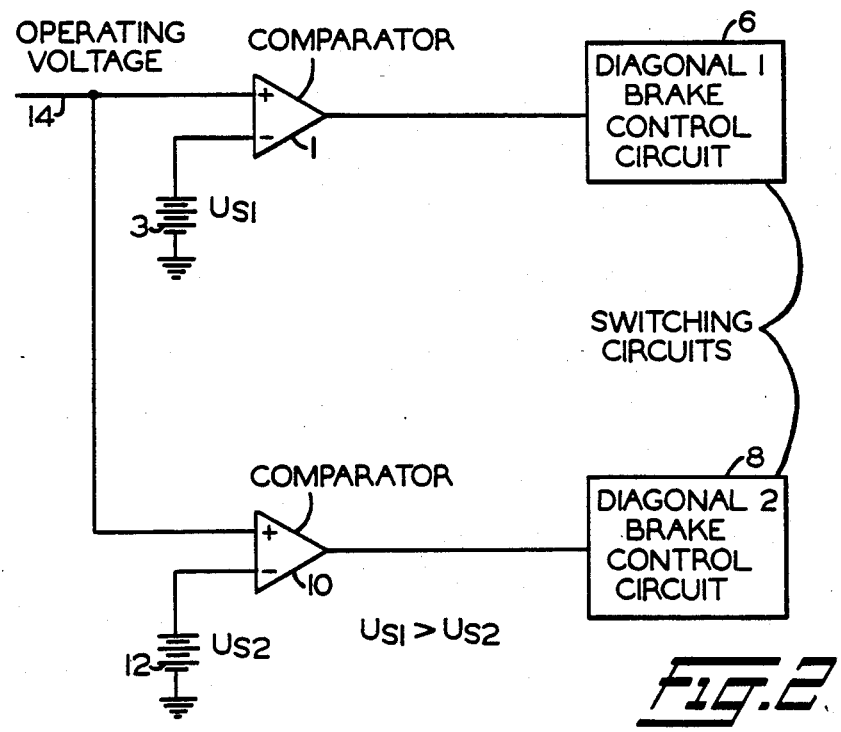
FIG. 2 illustrates another embodiment of the protection circuit of the present invention.

Referring now to FIG. 2, there is shown a second embodiment of the protection circuit for monitoring the operating voltage of the vehicle electrical system. This circuit operates with two threshold voltages for monitoring the operating voltage which is present on line 14. The first threshold voltage $U_{S1}$ is produced by a symbolically represented battery 3, while the second threshold voltage $U_{S2}$ is developed by a battery 12. In practice, the first voltage threshold $U_{S1}$ is higher than the second threshold voltage $U_{S2}$; and therefore, $U_{S1}$ is higher than $U_{S2}$. A drop of the operating voltage below the first threshold voltage is recognized by a comparator 1. The comparator then effects the disablement of the first diagonal switching circuit 6. In this condition, the vehicle can still be braked in a controlled manner by the second diagonal switching circuit 8, which controls one front wheel and one diagonally opposed rear wheel.

If, however, the operating voltage in the vehicle electrical system should also drop below the second threshold voltage $U_{S2}$, the second diagonal switching circuit 8 is also disabled by a second comparator 10.

It will be appreciated that the first diagonal switching circuit 6 preferably controls the left front wheel and the right rear wheel. This guarantees that, for the generally slippery right side of the road, a controlled right front wheel will be available. On vehicles operated in countries where traffic moves on the left side of the road, the other diagonal switching circuit 8 would correspondingly by disabled first.

On anti-skid systems which are not divided into two separate diagonal braking control layouts, the invention can also be appropriately applied; if, instead of the division into diagonal layouts, the braking system may be divided into axles. In this case, to maintain the stability of the vehicle, the front-axle control would be turned OFF or disabled first.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in which is claimed. It will be understood that variations, modifications, equivalents and substitutions for components of the above specifically-described embodiment of the invention may be made by those skilled in the art without departing from the spirit and scope of the invention as set forth in the appended claims.

Having thus described our invention, what we claim as new and desire to secure by Letters Patent, is:

1. A protection circuit for monitoring undervoltage conditions in a vehicle electrical system of a motor vehicle equipped with an anti-skid brake control system which is separated into two pairs of operational wheel brake units comprising:
   (a) a voltage comparator means for sensing when an operating voltage in the vehicle electrical system drops below a given threshold voltage value of a source of reference voltage; and
   (b) means controlled by the voltage comparator means for initially deactivating one of the two pair of operational wheel brake units and for subsequently deactivating the other of the two pairs of operational wheel brake units of the anti-skid brake control system when the operating voltage drops below the given threshold voltage value.

2. The protection circuit, according to claim 1, wherein the two pairs of operational wheel brake units are formed by two pairs of diagonal switching circuits so that one of the two diagonal switching circuits can be deactivated separately.

3. The protection circuit, according to claim 2, wherein the voltage comparator means immediately deactivates and reactivates one of the two diagonal switching circuits when the given threshold voltage value is exceeded.

4. The protection circuit, according to claim 2, wherein one of the two diagonal switching circuits is associated with a left front wheel and a right rear wheel of the motor vehicle.

5. The protection circuit, according to claim 1, wherein the two pairs of operational wheel brake units are formed by each axle of the motor vehicle, which can be controlled separately.

6. A protection circuit for monitoring undervoltage conditions in a vehicle electrical system of a motor vehicle equipped with an anti-skid brake control system which is separated into two pairs of operational wheel brake units comprising:
  (a) a voltage comparator means having an output for sensing when an operating voltage in the vehicle electrical system drops below a given threshold voltage value of a source of reference voltage; and
  (b) means controlled by the voltage comparator means for initially deactivating one of the two pairs of operational wheel brake units and for subsequently deactivating the other of the two pairs of operational wheel brake units of the anti-skid brake control system when the operating voltage drops below the given threshold voltage value wherein the two pairs of operational wheel brake units are formed by two diagonal switching circuits so that one of the two diagonal switching circuits can be deactivated separately, and wherein the output of the voltage comparator means is connected to a first timing circuit which immediately deactivates one of the two diagonal switching circuits when the voltage comparator means is activated and which reactivates one of the two diagonal switching circuits, after a certain time delay, when the voltage comparator means is deactivated.

7. The protection circuit, according to claim 6, wherein the output of the voltage comparator means is connected to a second timing circuit which deactivates the second of the two diagonal switching circuits when the voltage comparator means is activated and which immediately activates the second of the two diagonal switching circuits when the voltage comparator means is deactivated.

8. The protection circuit, according to claim 6, wherein an additional voltage comparator means monitors an internal voltage of the anti-skid base control system appearing on a line; and when the internal voltage is below an additional threshold voltage, both of the two diagonal switching circuits are immediately deactivated.

9. A protection circuit for monitoring undervoltage conditions in the vehicle electrical system of a motor vehicle equipped with an anti-skid brake control system which is separated into two pairs of operational wheel brake units having two diagonal switching circuits comprising:
  (a) a first and a second voltage comparator means for sensing when an operating voltage is a vehicle electrical system drops below a given threshold voltage value of a source of reference voltage; and
  (b) means controlled by the first voltage comparator means for initially deactivating one of the two pairs of operational wheel brake units and for subsequently deactivating the other of the two pairs of operational wheel brake units of the anti-skid brake control system when the operating voltage drops below the given threshold voltage value wherein the first voltage comparator means immediately deactivates and reactivates one of the two diagonal switching circuits when the given threshold voltage value is exceeded, and wherein the second voltage comparator means immediately deactivates and reactivates the second one of the two diagonal switching circuits when the second voltage threshold voltage value is exceeded and the other threshold voltage value is less than the given threshold voltage value.

* * * * *

UNITED STATES PATENT AND TRADEMARK OFFICE
CERTIFICATE OF CORRECTION

PATENT NO. : 4,661,910
DATED : April 28, 1987
INVENTOR(S) : Erich Reinecke & Gerhard Ruhnau It is certified that error appears in the above-identified patent and that said Letters Patent are hereby corrected as shown below:

Column 4, Claim 1(b), line 43, delete "pair" and insert

--pairs--

Column 6, Claim 8, line 3, delete "base" and insert --brake--

Claim 9, line 15, delete "is a" and insert --in the-- line 31, delete "the second voltage" and insert --another--

Signed and Sealed this

Fifteenth Day of September, 1987

*Attest:*

DONALD J. QUIGG

*Attesting Officer*     *Commissioner of Patents and Trademarks*